(12) United States Patent
Panusopone et al.

(10) Patent No.: US 10,992,934 B2
(45) Date of Patent: Apr. 27, 2021

(54) POST-FILTERING FOR WEIGHTED ANGULAR PREDICTION

(71) Applicant: ARRIS Enterprises LLC, Suwanee, GA (US)

(72) Inventors: Krit Panusopone, San Diego, CA (US); Yue Yu, San Diego, CA (US); Seungwook Hong, San Diego, CA (US); Limin Wang, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/027,585

(22) Filed: Jul. 5, 2018

(65) Prior Publication Data

US 2019/0014316 A1 Jan. 10, 2019

Related U.S. Application Data

(60) Provisional application No. 62/528,724, filed on Jul. 5, 2017.

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/105* (2014.11); *H04N 19/119* (2014.11);
(Continued)

(58) Field of Classification Search
None
See application file for complete search history.

(56) References Cited

FOREIGN PATENT DOCUMENTS

| EP | 2890130 A1 | 7/2015 |
| WO | 2012/035640 A1 | 3/2012 |

(Continued)

OTHER PUBLICATIONS

Chen et al., "Algorithm Description of Joint Exporation Test Model 5 (JEM 5)", International Organization For Standardization. ISO/IEC JTC1/ SC29/ WG11/N16698. Geneva, CH—Jan. 2017, 44 pages. (Year: 2017).*

(Continued)

*Primary Examiner* — William C Vaughn, Jr.
*Assistant Examiner* — Joseph Daniel A Towe
(74) *Attorney, Agent, or Firm* — Chernoff, Vilhauer, McClung & Stenzel, LLP

(57) ABSTRACT

A method of partitioning a video coding block for JVET, comprising representing a JVET coding tree unit as a root node in a quadtree plus binary tree (QTBT) structure that can have a quadtree branching from the root node and binary trees branching from each of the quadtree's leaf nodes using asymmetric binary partitioning to split a coding unit represented by a quadtree leaf node into two child nodes of unequal size, representing the two child nodes as leaf nodes in a binary tree branching from the quadtree leaf node and coding the child nodes represented by leaf nodes of the binary tree with JVET, wherein weighted angular coding unit prediction is employed and wherein post-coding unit prediction filtering can be avoided or unbiased to increase coding times.

6 Claims, 13 Drawing Sheets

(51) Int. Cl.
H04N 19/105 (2014.01)
H04N 19/159 (2014.01)
H04N 19/139 (2014.01)
H04N 19/513 (2014.01)
H04N 19/119 (2014.01)
H04N 19/593 (2014.01)
H04N 19/82 (2014.01)

(52) U.S. Cl.
CPC ......... H04N 19/139 (2014.11); H04N 19/159 (2014.11); H04N 19/176 (2014.11); H04N 19/521 (2014.11); H04N 19/593 (2014.11); H04N 19/82 (2014.11)

(56) References Cited

FOREIGN PATENT DOCUMENTS

WO 2017/205701 A1 11/2017
WO 2017/205703 A1 11/2017

OTHER PUBLICATIONS

Panusopone et al., "Weighted Angular Prediction", Joint Video Exploration Team (JVET) of ITU-T SG16 WP3 and ISO/IEC JTC1/SC29/ WG11, Hobart, AU, Mar. 3,-Apr. 7, 2017, 4 pages. (Year: 2017).*
Chen et al., "Algorithm Description of Joint Exploration Test Model 5 (JEM 5)", International Organization For Standardization. ISO/IEC JTC1/ SC29/ WG11/ N16698, Geneva, CH, Jan. 2017, 44 pages. (Year: 2017).*
Wige et al., "Sample-Based WEighted Prediction with Directional Template Matching for HEVC Lossless Coding", IEEE Jan. 2013. (Year: 2013).*
PCT International Search Report & Written Opinion, Re: Application No. PCT/US2018/040862, dated Sep. 24, 2018.
K. Panusopone, et al., "Weighted Angular Prediction", 6th JVET Meeting, JVET-F0104, Apr. 4, 2017.
Algorithm Description of Joint Exploration Test Model 5 (JEM5), 117th MPEG Meeting No. N16698, Feb. 13, 2017.
K. Panusopone, et al., "Comparisons between UWP, W66 and Planar, Angular mode 66 under the same coding conditions", Joint Video Exploration Team (JVET) of ITU-T SG 16 WP 3 and ISO/IEC JTC 1/SC 29/WG 11, 7th Meeting: Torino, IT, Jul. 13-21, 2017.
Y.-J. Chang, et al., "Arbitrary reference tier for Intra directional modes", Joint Video Exploration Team (JVET) of ITU-T SG16 WP3 and ISO/IET JTC 1/SC 29/WG11, JVET C0043, 3rd Meeting, May 26-Jun. 1, 2016, 3 pgs.
PCT International Search Report & Written Opinion, Re: Application No. PCT/US2017/068682, dated Mar. 16, 2018.
S. Yu, et al., "Distance-based weighted prediction for H.264 intra codiing", Audio, Language and Image Processing, Jul. 7, 2008, pp. 1477-1480.
K. Panusopone, et al., "Unequal Weight Planar Prediction and Constrained PDPC" 5th JVET Meeting, (The Joint Video Exploration Team of ISO/IEC JTC1/SC29/WG11 and ITU-T SG.16, No. JVET-E0068, Jan. 5, 2017.
J. Chen, et al., "Algorithm Description of Joint Exploration Test Model 5," JVET-E1001, Jan. 2017.
PCT International Search Report & Written Opinion, Re: Application No. PCT/US2017/034594, dated Aug. 16, 2017.
Y. Ye, et al., "Improved h.264 intra coding based on bi-directional intra prediction, directional transform, and adaptive coefficient scanning", 15th IEEE International Conference on Image Processing, Oct. 12, 2008 pp. 2116-2119.
S. Matsuo, et al., "AHG7: Modification of intra angular prediction blending" 12th JCTD-VC Meeting, 103rd MPEG Meeting, (Joint Collaborative Team on Video Coding of ISO/IEC JTC1/SC29/WG11 and ITU-T SG.16), No. JCTVC-L0128, Jan. 7, 2013.
K. Suehring and X. Li, "JVET common test conditions and software reference configurations," JVET 2nd meeting, Joint Video Exploration Team (JVET) of ITU-T SG16/WP3 and ISO/IEC JTC1/SC29/WG11, JVET-B1010, Feb. 2016.
K. Panusopone, et al., "Weighted Angular Prediction", 6th Meeting, Joint Video Exploration Team (JVET) of ITU-T SG16/WP3 and ISO/IEC JTC1/SC29/WG11, JVET-F0104, Mar. 3-Apr. 7, 2017.
J. Chen, et al., "Algorithm Description of Joint Exploration Test Model 4", 4th Meeting, Joint Video Exploration Team (JVET) of ITU-T SG16/WP3 and ISO/IEC JTC1/SC29/WG11, JVET-D1001-v3, Oct. 15-21, 2016.
T. Shiodera, et al., "CE6 Subset A: Bidirectional Intra prediction (JCTVC-C079)", 95th MPEG Meeting (Motion Picture Expert Group or ISO/IEC JTC1/SC29/WG11, No. m18859, Jan. 20, 2011.
Y. Lin, et al., "JCTVC-F509: CE6.a: Report of Bidirectional UDI mode for Intra prediction", Hisilicon Technologies, Ltd., V2, Jul. 14, 2011, 8 pgs.
PCT International Search Report & Written Opinion, Re: Application No. PCT/US2017/034592, dated Aug. 16, 2017.

* cited by examiner

Asymmetric Partitioning
Type 1

Asymmetric Partitioning
Type 2

Asymmetric Partitioning
Type 3

Asymmetric Partitioning
Type 4

POST-FILTERING FOR WEIGHTED ANGULAR PREDICTION

CLAIM OF PRIORITY

This Application claims priority under 35 U.S.C. § 119(e) from earlier filed U.S. Provisional Application Ser. No. 62/528,724, filed Jul. 5, 2017, which is hereby incorporated by reference.

TECHNICAL FIELD

The present disclosure relates to the field of video coding, particularly increased coding efficiency enabling higher bit-rates, resolutions and better quality video by modifications to the intra-prediction coding processes utilizing weighted angular prediction coding.

BACKGROUND

The technical improvements in evolving video coding standards illustrate the trend of increasing coding efficiency to enable higher bit-rates, higher resolutions, and better video quality. The Joint Video Exploration Team is developing a new video coding scheme referred to as JVET. Similar to other video coding schemes like HEVC (High Efficiency Video Coding), JVET is a block-based hybrid spatial and temporal predictive coding scheme. However, relative to HEVC, JVET includes many modifications to bitstream structure, syntax, constraints, and mapping for the generation of decoded pictures. JVET has been implemented in Joint Exploration Model (JEM) encoders and decoders which utilize various coding techniques including weighted angular prediction.

In current NET design, three steps are involved in generating a final intra predictor block; pre-filtering, predictor generation, and post-filtering. Generally, pre-filtering applies a filtering operation such as mode dependent intra smoothing or MDIS to neighbor pixels to prepare for the predictor generation step. Then the predictor generation step computes predictor pixels according to rules associated with a selected intra prediction mode. Finally, post-filtering applies a filtering operation for items such as boundary smoothing to the predictor pixels along block boundary to reduce discontinuity across block boundary.

SUMMARY

The present disclosure provides a method of coding a NET bitstream which comprises defining a coding unit (CU) within a coding area of a video frame having CU x and CU y coordinates then defining a main reference pixel within said coding area having main x and main y coordinates associated with said main reference and defining a side reference pixel within said coding area having side x and side y coordinates associated with said side reference. Additionally, a main weight value associated with said main reference pixel can be determined and a side weight value associated with said side reference pixel can also be determined. Then the method can generate a prediction CU for said coding unit based at least in part on a combination of said main reference pixel combined with said main weight value and said side reference pixel combined with said side weight value.

In some embodiments, post-prediction filtering can be applied in an unbiased manner relative to the main reference pixel and/or the side reference pixel. In alternate embodiments, post-prediction filtering can be bypassed or an all-pass filter can be applied.

BRIEF DESCRIPTION OF THE DRAWINGS

Further details of the present invention are explained with the help of the attached drawings in which.

DETAILED DESCRIPTION

Figure 1:
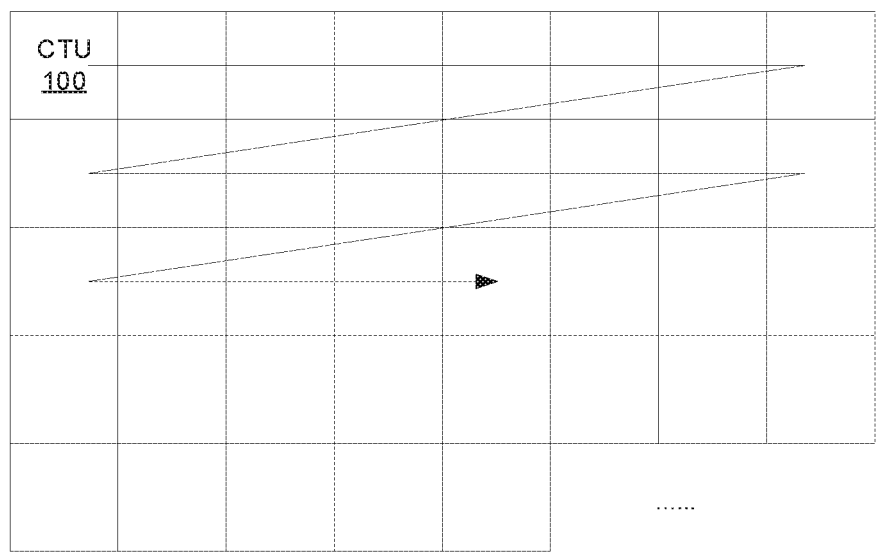
FIG. 1 depicts division of a frame into a plurality of Coding Tree Units (CTUs).

FIG. 1 depicts division of a frame into a plurality of Coding Tree Units (CTUs) 100. A frame can be an image in a video sequence. A frame can include a matrix, or set of matrices, with pixel values representing intensity measures in the image. Thus, a set of these matrices can generate a video sequence. Pixel values can be defined to represent color and brightness in full color video coding, where pixels are divided into three channels. For example, in a YCbCr color space pixels can have a luma value, Y, that represents gray level intensity in the image, and two chrominance values, Cb and Cr, that represent the extent to which color differs from gray to blue and red. In other embodiments, pixel values can be represented with values in different color spaces or models. The resolution of the video can determine the number of pixels in a frame. A higher resolution can mean more pixels and a better definition of the image, but can also lead to higher bandwidth, storage, and transmission requirements.

Frames of a video sequence can be encoded and decoded using JVET. JVET is a video coding scheme being developed by the Joint Video Exploration Team. Versions of JVET have been implemented in JEM (Joint Exploration Model) encoders and decoders. Similar to other video coding schemes like HEVC (High Efficiency Video Coding), JVET is a block-based hybrid spatial and temporal predictive coding scheme. During coding with JVET, a frame is first divided into square blocks called CTUs 100, as shown in FIG. 1. For example, CTUs 100 can be blocks of 128×128 pixels.

Figures 2, 3:
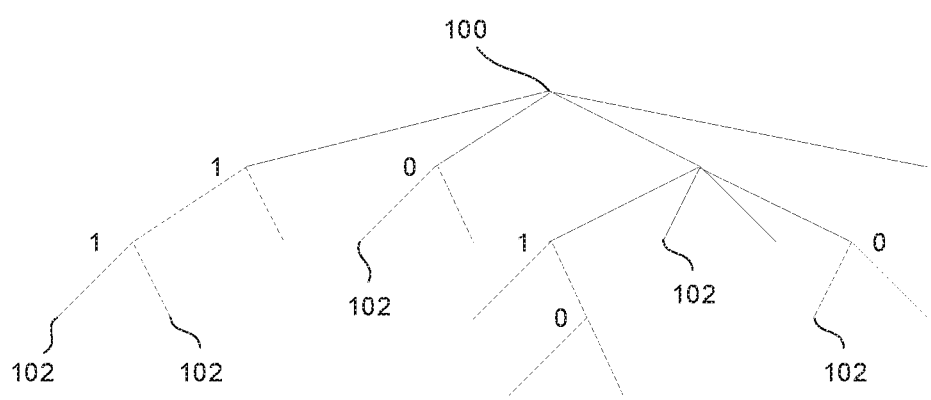
FIG. 2 depicts an exemplary partitioning of a CTU into Coding Units (CUs) using quadtree partitioning and symmetric binary partitioning.
FIG. 3 depicts a quadtree plus binary tree (QTBT) representation of FIG. 2's partitioning.

FIG. 2 depicts an exemplary partitioning of a CTU 100 into CUs 102. Each CTU 100 in a frame can be partitioned into one or more CUs (Coding Units) 102. CUs 102 can be used for prediction and transform as described below. Unlike HEVC, in JVET the CUs 102 can be rectangular or square, and can be coded without further partitioning into prediction units or transform units. The CUs 102 can be as large as their root CTUs 100, or be smaller subdivisions of a root CTU 100 as small as 4×4 blocks.

In JVET, a CTU 100 can be partitioned into CUs 102 according to a quadtree plus binary tree (QTBT) scheme in which the CTU 100 can be recursively split into square blocks according to a quadtree, and those square blocks can then be recursively split horizontally or vertically according to binary trees. Parameters can be set to control splitting according to the QTBT, such as the CTU size, the minimum sizes for the quadtree and binary tree leaf nodes, the maximum size for the binary tree root node, and the maximum depth for the binary trees.

In some embodiments JVET can limit binary partitioning in the binary tree portion of a QTBT to symmetric partitioning, in which blocks can be divided in half either vertically or horizontally along a midline.

By way of a non-limiting example, FIG. 2 shows a CTU 100 partitioned into CUs 102, with solid lines indicating quadtree splitting and dashed lines indicating symmetric binary tree splitting. As illustrated, the binary splitting allows symmetric horizontal splitting and vertical splitting to define the structure of the CTU and its subdivision into CUs.

FIG. 3 shows a QTBT representation of FIG. 2's partitioning. A quadtree root node represents the CTU 100, with each child node in the quadtree portion representing one of four square blocks split from a parent square block. The square blocks represented by the quadtree leaf nodes can then be divided symmetrically zero or more times using binary trees, with the quadtree leaf nodes being root nodes of the binary trees. At each level of the binary tree portion, a block can be divided symmetrically, either vertically or horizontally. A flag set to "0" indicates that the block is symmetrically split horizontally, while a flag set to "1" indicates that the block is symmetrically split vertically.

In other embodiments JVET can allow either symmetric binary partitioning or asymmetric binary partitioning in the binary tree portion of a QTBT. Asymmetrical motion partitioning (AMP) was allowed in a different context in HEVC when partitioning prediction units (PUs). However, for partitioning CUs 102 in JVET according to a QTBT structure, asymmetric binary partitioning can lead to improved partitioning relative to symmetric binary partitioning when correlated areas of a CU 102 are not positioned on either side of a midline running through the center of the CU 102. By way of a non-limiting example, when a CU 102 depicts one object proximate to the CU's center and another object at the side of the CU 102, the CU 102 can be asymmetrically partitioned to put each object in separate smaller CUs 102 of different sizes.

Figure 4:
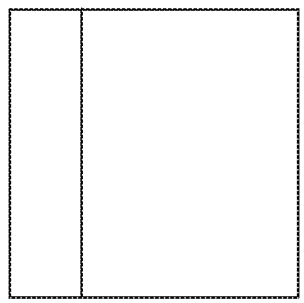
FIG. 4 depicts four possible types of asymmetric binary partitioning of a CU into two smaller CUs.
Figure 4:
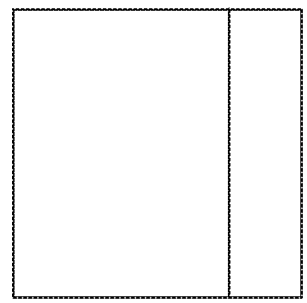
Figure 4:
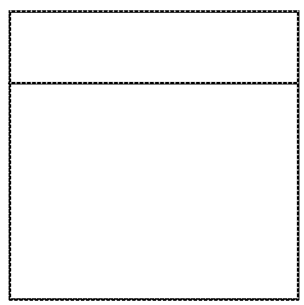
Figure 4:
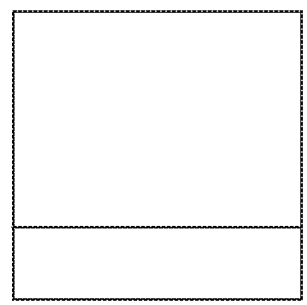

FIG. 4 depicts four possible types of asymmetric binary partitioning in which a CU 102 is split into two smaller CU 102 along a line running across the length or height of the CU 102, such that one of the smaller CUs 102 is 25% of the size of the parent CU 102 and the other is 75% of the size of the parent CU 102. The four types of asymmetric binary partitioning shown in FIG. 4 allow a CU 102 to be split along a line 25% of the way from the left side of the CU 102, 25% of the way from the right side of the CU 102, 25% of the way from the top of the CU 102, or 25% of the way from the bottom of the CU 102. In alternate embodiments an asymmetric partitioning line at which a CU 102 is split can be positioned at any other position such the CU 102 is not divided symmetrically in half.

Figure 5:
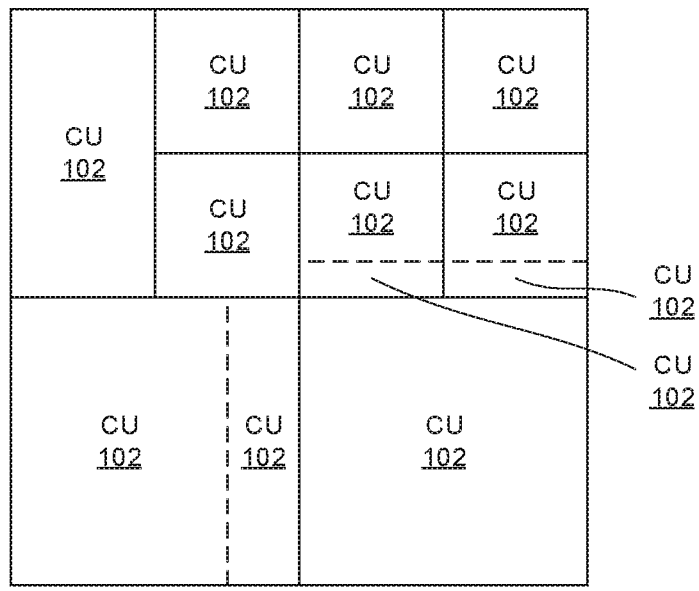
FIG. 5 depicts an exemplary partitioning of a CTU into CUs using quadtree partitioning, symmetric binary partitioning, and asymmetric binary partitioning.

FIG. 5 depicts a non-limiting example of a CTU 100 partitioned into CUs 102 using a scheme that allows both symmetric binary partitioning and asymmetric binary partitioning in the binary tree portion of a QTBT. In FIG. 5, dashed lines show asymmetric binary partitioning lines, in which a parent CU 102 was split using one of the partitioning types shown in FIG. 4.

Figure 6:
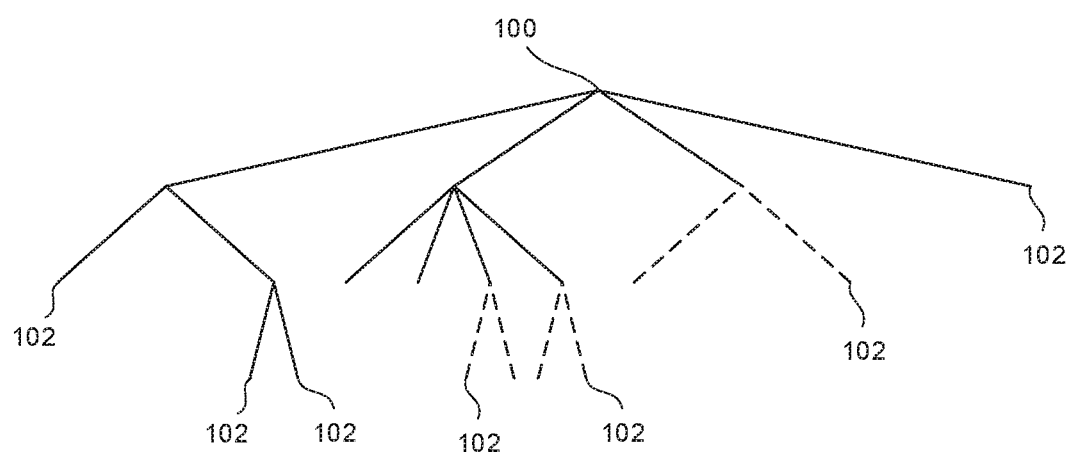
FIG. 6 depicts a QTBT representation of FIG. 5's partitioning.

FIG. 6 shows a QTBT representation of FIG. 5's partitioning. In FIG. 6, two solid lines extending from a node indicates symmetric partitioning in the binary tree portion of a QTBT, while two dashed lines extending from a node indicates asymmetric partitioning in the binary tree portion.

Syntax can be coded in the bitstream that indicates how a CTU 100 was partitioned into CUs 102. By way of a non-limiting example, syntax can be coded in the bitstream that indicates which nodes were split with quadtree partitioning, which were split with symmetric binary partitioning, and which were split with asymmetric binary partitioning. Similarly, syntax can be coded in the bitstream for nodes split with asymmetric binary partitioning that indicates which type of asymmetric binary partitioning was used, such as one of the four types shown in FIG. 4.

In some embodiments the use of asymmetric partitioning can be limited to splitting CUs 102 at the leaf nodes of the quadtree portion of a QTBT. In these embodiments, CUs 102 at child nodes that were split from a parent node using quadtree partitioning in the quadtree portion can be final CUs 102, or they can be further split using quadtree partitioning, symmetric binary partitioning, or asymmetric binary partitioning. Child nodes in the binary tree portion that were split using symmetric binary partitioning can be final CUs 102, or they can be further split recursively one or more times using symmetric binary partitioning only. Child nodes in the binary tree portion that were split from a QT leaf node using asymmetric binary partitioning can be final CUs 102, with no further splitting permitted.

In these embodiments, limiting the use of asymmetric partitioning to splitting quadtree leaf nodes can reduce search complexity and/or limit overhead bits. Because only quadtree leaf nodes can be split with asymmetric partitioning, the use of asymmetric partitioning can directly indicate the end of a branch of the QT portion without other syntax or further signaling. Similarly, because asymmetrically partitioned nodes cannot be split further, the use of asymmetric partitioning on a node can also directly indicate that its asymmetrically partitioned child nodes are final CUs 102 without other syntax or further signaling.

In alternate embodiments, such as when limiting search complexity and/or limiting the number of overhead bits is less of a concern, asymmetric partitioning can be used to split nodes generated with quadtree partitioning, symmetric binary partitioning, and/or asymmetric binary partitioning.

After quadtree splitting and binary tree splitting using either QTBT structure described above, the blocks represented by the QTBT's leaf nodes represent the final CUs 102 to be coded, such as coding using inter prediction or intra prediction. For slices or full frames coded with inter prediction, different partitioning structures can be used for luma and chroma components. For example, for an inter slice a CU 102 can have Coding Blocks (CBs) for different color components, such as such as one luma CB and two chroma CBs. For slices or full frames coded with intra prediction, the partitioning structure can be the same for luma and chroma components.

In alternate embodiments JVET can use a two-level coding block structure as an alternative to, or extension of, the QTBT partitioning described above. In the two-level coding block structure, a CTU 100 can first be partitioned at a high level into base units (BUs). The BUs can then be partitioned at a low level into operating units (OUs).

In embodiments employing the two-level coding block structure, at the high level a CTU 100 can be partitioned into BUs according to one of the QTBT structures described above, or according to a quadtree (QT) structure such as the one used in HEVC in which blocks can only be split into four equally sized sub-blocks. By way of a non-limiting example, a CTU 102 can be partitioned into BUs according to the QTBT structure described above with respect to FIGS. 5-6, such that leaf nodes in the quadtree portion can be split using quadtree partitioning, symmetric binary partitioning, or asymmetric binary partitioning. In this example, the final leaf nodes of the QTBT can be BUs instead of CUs.

At the lower level in the two-level coding block structure, each BU partitioned from the CTU 100 can be further partitioned into one or more OUs. In some embodiments, when the BU is square, it can be split into OUs using quadtree partitioning or binary partitioning, such as symmetric or asymmetric binary partitioning. However, when the BU is not square, it can be split into OUs using binary partitioning only. Limiting the type of partitioning that can be used for non-square BUs can limit the number of bits used to signal the type of partitioning used to generate BUs.

Although the discussion below describes coding CUs 102, BUs and OUs can be coded instead of CUs 102 in embodiments that use the two-level coding block structure. By way of a non-limiting examples, BUs can be used for higher level coding operations such as intra prediction or inter prediction, while the smaller OUs can be used for lower level coding operations such as transforms and generating transform coefficients. Accordingly, syntax for be coded for BUs that indicate whether they are coded with intra prediction or inter prediction, or information identifying particular intra prediction modes or motion vectors used to code the BUs. Similarly, syntax for OUs can identify particular transform operations or quantized transform coefficients used to code the OUs.

Figure 7A:
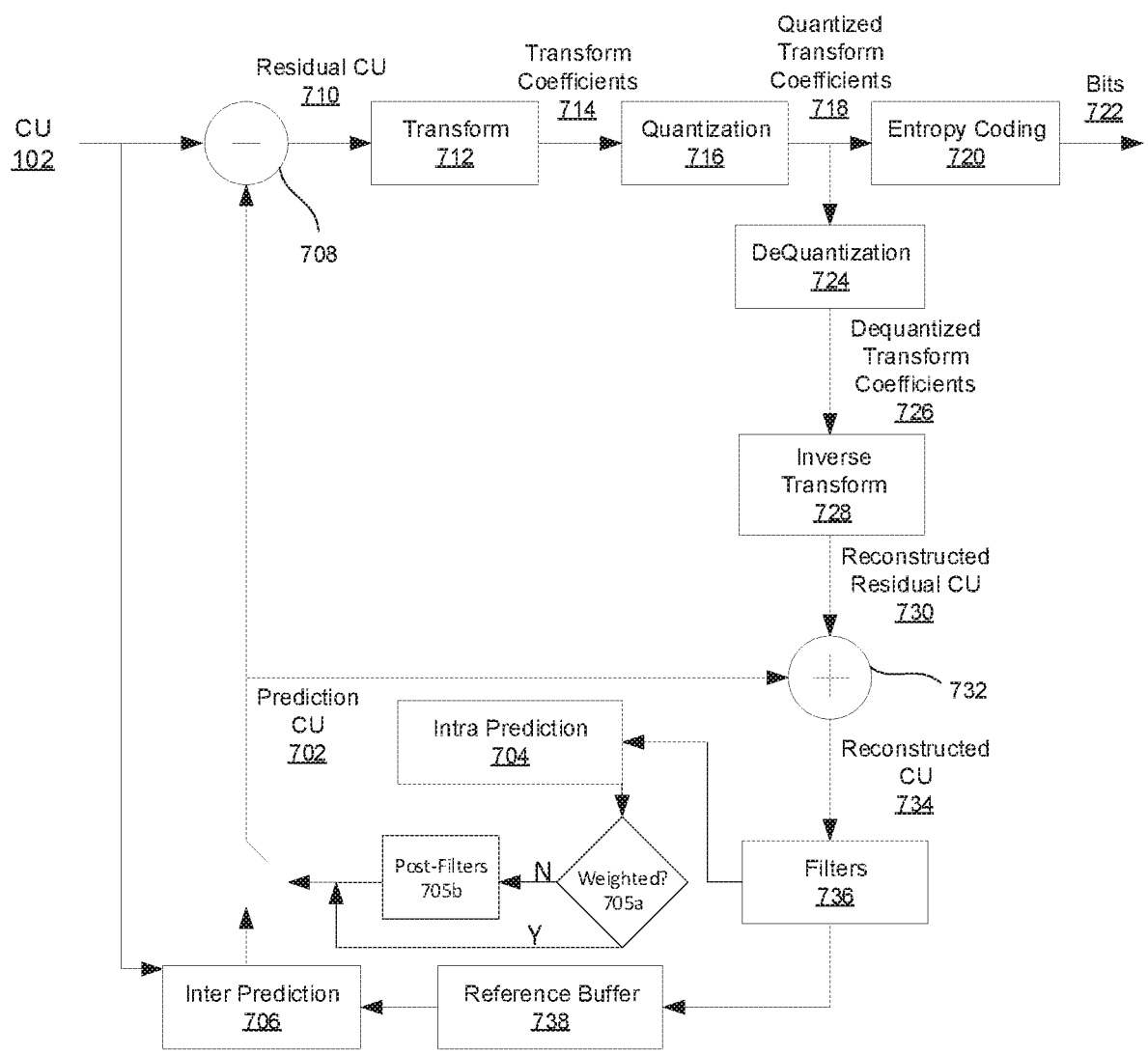
FIGS. 7A and 7B depict simplified block diagrams for CU coding in a JVET encoder.

FIG. 7A depicts a simplified block diagram for CU coding in a NET encoder. The main stages of video coding include partitioning to identify CUs 102 as described above, followed by encoding CUs 102 using prediction at 704 or 706, generation of a residual CU 710 at 708, transformation at 712, quantization at 716, and entropy coding at 720. The encoder and encoding process illustrated in FIG. 7A also includes a decoding process that is described in more detail below.

Given a current CU 102, the encoder can obtain a prediction CU 702 either spatially using intra prediction at 704 or temporally using inter prediction at 706. The basic idea of prediction coding is to transmit a differential, or residual, signal between the original signal and a prediction for the original signal. At the receiver side, the original signal can be reconstructed by adding the residual and the prediction, as will be described below. Because the differential signal has a lower correlation than the original signal, fewer bits are needed for its transmission.

A slice, such as an entire picture or a portion of a picture, coded entirely with intra-predicted CUs 102 can be an I slice that can be decoded without reference to other slices, and as such can be a possible point where decoding can begin. A slice coded with at least some inter-predicted CUs can be a predictive (P) or bi-predictive (B) slice that can be decoded based on one or more reference pictures. P slices may use intra-prediction and inter-prediction with previously coded slices. For example, P slices may be compressed further than the I-slices by the use of inter-prediction, but need the coding of a previously coded slice to code them. B slices can use data from previous and/or subsequent slices for its coding, using intra-prediction or inter-prediction using an interpolated prediction from two different frames, thus increasing the accuracy of the motion estimation process. In some cases P slices and B slices can also or alternately be encoded using intra block copy, in which data from other portions of the same slice is used.

As will be discussed below, intra prediction or inter prediction can be performed based on reconstructed CUs 734 from previously coded CUs 102, such as neighboring CUs 102 or CUs 102 in reference pictures.

When a CU 102 is coded spatially with intra prediction at 704, an intra prediction mode can be found that best predicts pixel values of the CU 102 based on samples from neighboring CUs 102 in the picture.

Figure 8:
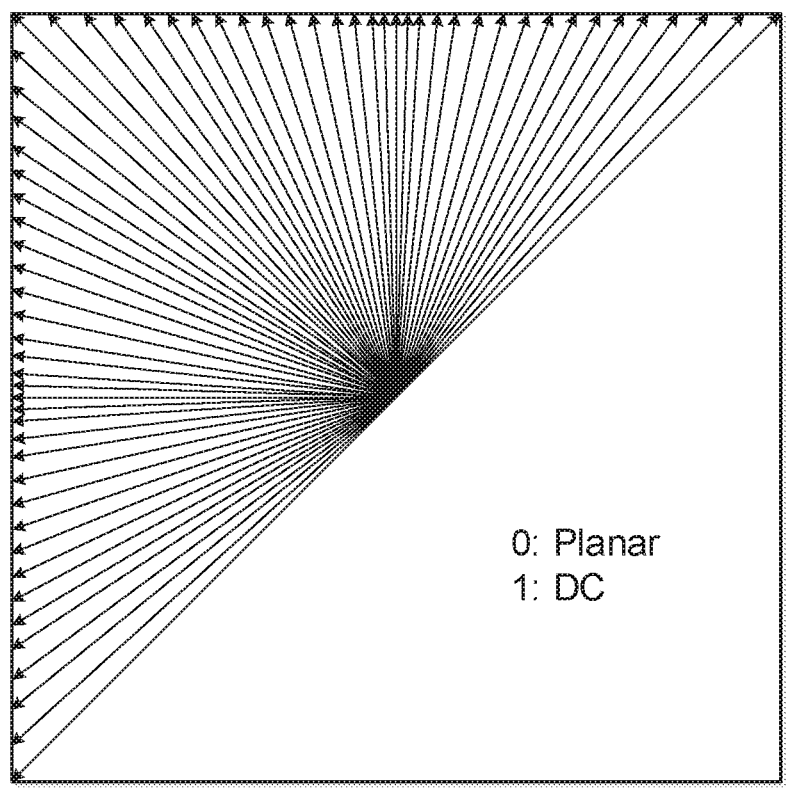
FIG. 8 depicts 67 possible intra prediction modes for luma components in JVET.

When coding a CU's luma component, the encoder can generate a list of candidate intra prediction modes. While HEVC had 35 possible intra prediction modes for luma components, in NET there are 67 possible intra prediction modes for luma components. These include a planar mode that uses a three dimensional plane of values generated from neighboring pixels, a DC mode that uses values averaged from neighboring pixels, and the 65 directional modes shown in FIG. 8 that use values copied from neighboring pixels along the indicated directions.

When generating a list of candidate intra prediction modes for a CU's luma component, the number of candidate modes on the list can depend on the CU's size. The candidate list can include: a subset of HEVC's 35 modes with the lowest SATD (Sum of Absolute Transform Difference) costs; new directional modes added for NET that neighbor the candidates found from the HEVC modes; and modes from a set of six most probable modes (MPMs) for the CU 102 that are identified based on intra prediction modes used for previously coded neighboring blocks as well as a list of default modes.

When coding a CU's chroma components, a list of candidate intra prediction modes can also be generated. The list of candidate modes can include modes generated with cross-component linear model projection from luma samples, intra prediction modes found for luma CBs in particular collocated positions in the chroma block, and chroma prediction modes previously found for neighboring blocks. The encoder can find the candidate modes on the lists with the lowest rate distortion costs, and use those intra prediction modes when coding the CU's luma and chroma components. Syntax can be coded in the bitstream that indicates the intra prediction modes used to code each CU 102.

After the best intra prediction modes for a CU 102 have been selected, the encoder can generate a prediction CU 402 using those modes. When the selected modes are directional modes, a 4-tap filter can be used to improve the directional accuracy. Columns or rows at the top or left side of the prediction block can be adjusted with boundary prediction filters, such as 2-tap or 3-tap filters.

The prediction CU 702 can be smoothed further with a position dependent intra prediction combination (PDPC) process that adjusts a prediction CU 702 generated based on filtered samples of neighboring blocks using unfiltered samples of neighboring blocks, or adaptive reference sample smoothing using 3-tap or 5-tap low pass filters to process reference samples in step 705b. In some embodiments, PDPC can be accomplished in accordance with the following Equation (1):

$$P'[x,y]=((A*\text{Recon}[x,-1]-B*\text{Recon}[-1,-1]+C*\text{Recon}[-1,y]+D*P[x,y]+\text{Round})/\text{Denom} \quad \text{Equation (1)}$$

where $A=(Cv1\gg\text{int}(y/dy))$, $B=((Cv2\gg\text{int}(y/dy))+(Ch2\gg\text{int}(x/dx)))$, $C=(Ch1\gg\text{int}(x/dx))$, and $D=(1\ll\text{Denom})-A-C+B$. Such that P'[x,y] is a filtered pixel after post-filtering operation at coordinate (x,y) of the current CU. Cv1, Cv2, Ch1, Ch2 are PDPC parameters determining filtering effect and 'Round' is a rounding parameter and 'Denom' is a normalization factor.

In some embodiments, weighted angular prediction, can be employed which generates predictor pixels for angular prediction using pixels at projected positions on both a top reference row and a left reference column. In embodiments employing weighted angular prediction, the prediction generation can be done in three steps—main reference projected prediction, side reference projected prediction and combination of the projected predictions.

In some embodiments employing weighted angular prediction, the system and method can project a pixel position along a main reference according to an angular direction definition of the coding intra prediction mode and determine a pixel value of the projected position using linear interpolation between two neighboring reconstructed pixels. The system and method can also project a pixel position along a side reference according to the angular definition of the same coding mode and determine a pixel value of the projected position using linear interpolation between two neighboring reconstructed pixels. Then the system and method can combine the projected pixel value of the main reference with the projected pixel value of the side reference. A non-limiting exemplary combination is shown below in Equation (2). In the exemplary combination shows in Equation (2) the values are weighted according to the distances between the predictor pixels and projected pixel positions on the main and side references. However, in alternate embodiments alternate values can be used to weight the values associated with the main and side reference pixels.

$$P[x,y]=(((w1*\text{MainRecon}[x',y'])+(w2*\text{SideRecon}[x'',y''])+(w1+w2)/2)/(w1+w2)) \quad \text{Equation (2)}$$

In exemplary Equation (1) above, MainRecon[x',y'] is a pixel value of neighbor at projected position (x',y'), corresponding to the predicting pixel (x,y), along the main reference. SideRecon[x'',y''] is a pixel value of neighbor at projected position (x'',y''), corresponding to the predicting pixel (x,y), along the side reference.

Equation (3) below shows a non-limiting exemplary combination using weighted angular prediction using HEVC mode 2 or mode 66, and a predictor pixel at coordinate (x,y). Accordingly, P[x,y], would be determined as shown and described in Equation (3), in which Recon[0,0] is a reconstructed pixel at top left coordinate (0,0) of the current CU.

$$P[x,y]=((((x+1)*\text{Recon}[x+y+2,-1])+((y+1)*(\text{Recon}[-1,x+y+2]))+(y+x+2)/2)/(y+x+2)) \quad \text{Equation (3)}$$

An exception to the system and process in which weighted angular prediction might not be employed can occur when a projected reference position on the side reference refers to a reconstructed position that is not a viable position or is not available. In such instances when weighted angular prediction may not be employed, multiple options are possible to handle the exception. In some embodiments, the exception can be handled by using the value of last available reconstructed pixel or a default value for a projected position. In other alternate embodiments, the exception can be handled by disabling weighted angular prediction and/or using a projected pixel position of the main reference only. Thus, in step 705a, it can be determined whether weighted angular prediction has been employed as the intra prediction mode in step 704. If in step 705a, the intra prediction mode is determined as using weighted angular prediction, then the prediction coding unit 702 can be delivered for entropy coding absent filtering. However, if in step 705a, the intra prediction mode is determined to be other than weighted angular prediction, post intra prediction filtering 705b, such as PDPC filtering can be applied to the prediction coding unit prior to delivery for entropy coding.

Figure 7B:
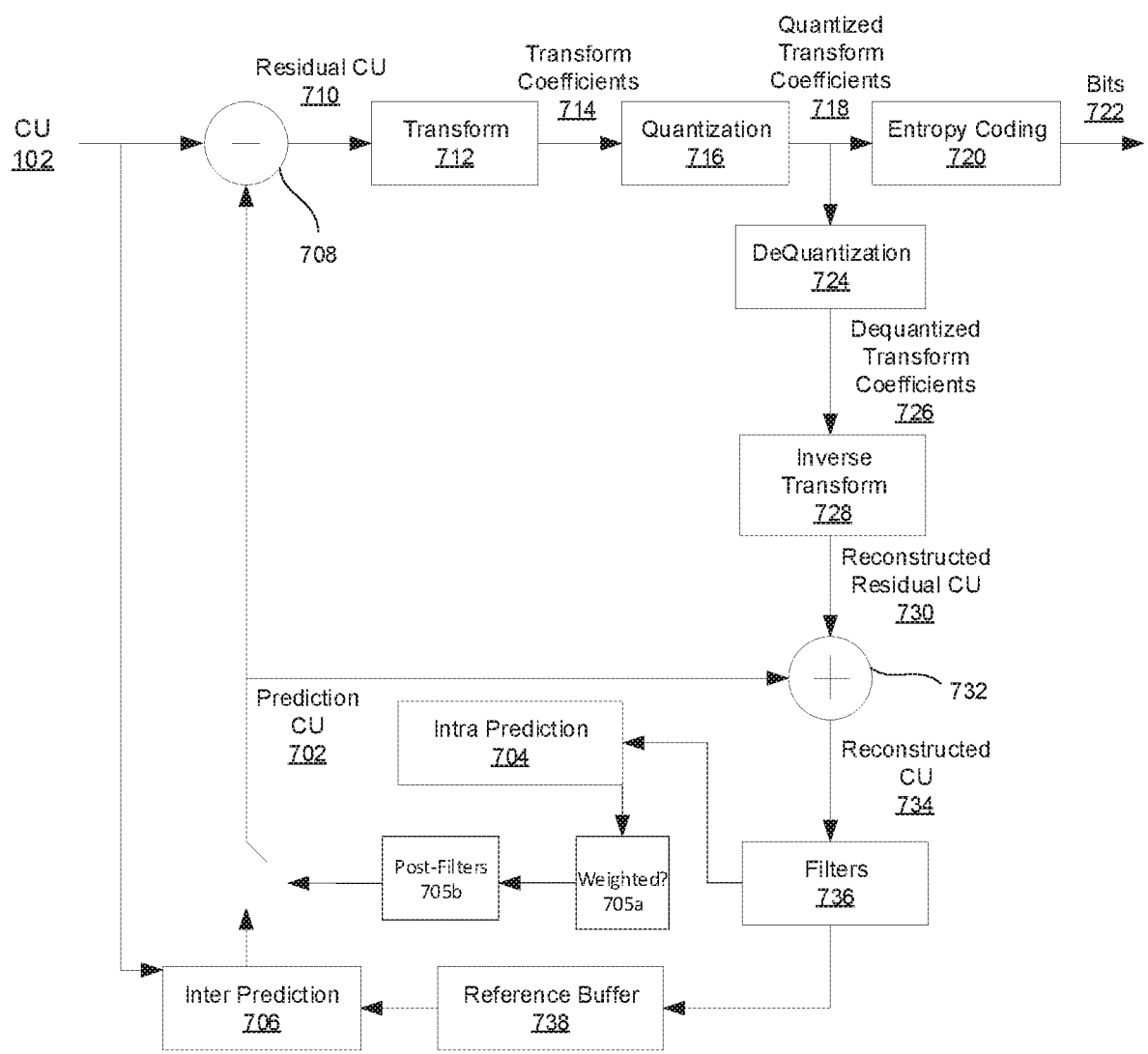

As depicted in FIG. 7B, in some embodiments, a post intra prediction filter 705b can be employed after step 704 for all intra predictions. In such embodiments depicted in FIG. 7B, if the intra prediction mode is based upon other than weighted angular prediction, then the filter applied can applied as it would normally be applied in step 705b. However, if the intra prediction mode is based upon weighted angular prediction filtering in step 705b can be bypassed and/or in some embodiments, the filter applied can be unbiased toward the main reference, side reference or main and side references. By way on non-limiting example, the values of Cv1 and Ch1 can be equal and/or the values of Cv2 and Ch2 can be equal.

When a CU 102 is coded temporally with inter prediction at 706, a set of motion vectors (MVs) can be found that points to samples in reference pictures that best predict pixel values of the CU 102. Inter prediction exploits temporal redundancy between slices by representing a displacement of a block of pixels in a slice. The displacement is determined according to the value of pixels in previous or following slices through a process called motion compensation. Motion vectors and associated reference indices that indicate pixel displacement relative to a particular reference picture can be provided in the bitstream to a decoder, along with the residual between the original pixels and the motion compensated pixels. The decoder can use the residual and signaled motion vectors and reference indices to reconstruct a block of pixels in a reconstructed slice.

In JVET, motion vector accuracy can be stored at 1/16 pel, and the difference between a motion vector and a CU's predicted motion vector can be coded with either quarter-pel resolution or integer-pel resolution.

In JVET motion vectors can be found for multiple sub-CUs within a CU 102, using techniques such as advanced temporal motion vector prediction (ATMVP), spatial-temporal motion vector prediction (STMVP), affine motion compensation prediction, pattern matched motion vector derivation (PMMVD), and/or bi-directional optical flow (BIO).

Using ATMVP, the encoder can find a temporal vector for the CU 102 that points to a corresponding block in a reference picture. The temporal vector can be found based on motion vectors and reference pictures found for previously coded neighboring CUs 102. Using the reference block pointed to by a temporal vector for the entire CU 102, a motion vector can be found for each sub-CU within the CU 102.

STMVP can find motion vectors for sub-CUs by scaling and averaging motion vectors found for neighboring blocks previously coded with inter prediction, together with a temporal vector.

Affine motion compensation prediction can be used to predict a field of motion vectors for each sub-CU in a block, based on two control motion vectors found for the top corners of the block. For example, motion vectors for sub-CUs can be derived based on top corner motion vectors found for each 4×4 block within the CU 102.

PMMVD can find an initial motion vector for the current CU 102 using bilateral matching or template matching. Bilateral matching can look at the current CU 102 and reference blocks in two different reference pictures along a motion trajectory, while template matching can look at corresponding blocks in the current CU 102 and a reference picture identified by a template. The initial motion vector found for the CU 102 can then be refined individually for each sub-CU.

BIO can be used when inter prediction is performed with bi-prediction based on earlier and later reference pictures, and allows motion vectors to be found for sub-CUs based on the gradient of the difference between the two reference pictures.

In some situations local illumination compensation (LIC) can be used at the CU level to find values for a scaling factor parameter and an offset parameter, based on samples neighboring the current CU 102 and corresponding samples neighboring a reference block identified by a candidate motion vector. In JVET, the LIC parameters can change and be signaled at the CU level.

For some of the above methods the motion vectors found for each of a CU's sub-CUs can be signaled to decoders at the CU level. For other methods, such as PMMVD and BIO, motion information is not signaled in the bitstream to save overhead, and decoders can derive the motion vectors through the same processes.

After the motion vectors for a CU 102 have been found, the encoder can generate a prediction CU 702 using those motion vectors. In some cases, when motion vectors have been found for individual sub-CUs, Overlapped Block Motion Compensation (OBMC) can be used when generating a prediction CU 702 by combining those motion vectors with motion vectors previously found for one or more neighboring sub-CUs.

When bi-prediction is used, JVET can use decoder-side motion vector refinement (DMVR) to find motion vectors. DMVR allows a motion vector to be found based on two motion vectors found for bi-prediction using a bilateral template matching process. In DMVR, a weighted combination of prediction CUs 702 generated with each of the two motion vectors can be found, and the two motion vectors can be refined by replacing them with new motion vectors that best point to the combined prediction CU 702. The two refined motion vectors can be used to generate the final prediction CU 702.

At 708, once a prediction CU 702 has been found with intra prediction at 704 or inter prediction at 706 as described above, the encoder can subtract the prediction CU 702 from the current CU 102 find a residual CU 710.

The encoder can use one or more transform operations at 712 to convert the residual CU 710 into transform coefficients 714 that express the residual CU 710 in a transform domain, such as using a discrete cosine block transform (DCT-transform) to convert data into the transform domain. JVET allows more types of transform operations than HEVC, including DCT-II, DST-VII, DST-VII, DCT-VIII, DST-I, and DCT-V operations. The allowed transform operations can be grouped into sub-sets, and an indication of which sub-sets and which specific operations in those sub-sets were used can be signaled by the encoder. In some cases, large block-size transforms can be used to zero out high frequency transform coefficients in CUs 102 larger than a certain size, such that only lower-frequency transform coefficients are maintained for those CUs 102.

In some cases a mode dependent non-separable secondary transform (MDNSST) can be applied to low frequency transform coefficients 714 after a forward core transform. The MDNSST operation can use a Hypercube-Givens Transform (HyGT) based on rotation data. When used, an index value identifying a particular MDNSST operation can be signaled by the encoder.

At 716, the encoder can quantize the transform coefficients 714 into quantized transform coefficients 716. The quantization of each coefficient may be computed by dividing a value of the coefficient by a quantization step, which is derived from a quantization parameter (QP). In some embodiments, the Qstep is defined as $2^{(QP-4)/6}$. Because high precision transform coefficients 714 can be converted into quantized transform coefficients 716 with a finite number of possible values, quantization can assist with data compression. Thus, quantization of the transform coefficients may limit an amount of bits generated and sent by the transformation process. However, while quantization is a lossy operation, and the loss by quantization cannot be recovered, the quantization process presents a trade-off between quality of the reconstructed sequence and an amount of information needed to represent the sequence. For example, a lower QP value can result in better quality decoded video, although a higher amount of data may be required for representation and transmission. In contrast, a high QP value can result in lower quality reconstructed video sequences but with lower data and bandwidth needs.

JVET can utilize variance-based adaptive quantization techniques, which allows every CU 102 to use a different quantization parameter for its coding process (instead of using the same frame QP in the coding of every CU 102 of the frame). The variance-based adaptive quantization techniques adaptively lowers the quantization parameter of certain blocks while increasing it in others. To select a specific QP for a CU 102, the CU's variance is computed. In brief, if a CU's variance is higher than the average variance of the frame, a higher QP than the frame's QP may be set for the CU 102. If the CU 102 presents a lower variance than the average variance of the frame, a lower QP may be assigned.

At 720, the encoder can find final compression bits 722 by entropy coding the quantized transform coefficients 718. Entropy coding aims to remove statistical redundancies of the information to be transmitted. In JVET, CABAC (Context Adaptive Binary Arithmetic Coding) can be used to code the quantized transform coefficients 718, which uses probability measures to remove the statistical redundancies. For CUs 102 with non-zero quantized transform coefficients 718, the quantized transform coefficients 718 can be converted into binary. Each bit ("bin") of the binary representation can then be encoded using a context model. A CU 102 can be broken up into three regions, each with its own set of context models to use for pixels within that region.

Multiple scan passes can be performed to encode the bins. During passes to encode the first three bins (bin0, bin1, and bin2), an index value that indicates which context model to use for the bin can be found by finding the sum of that bin position in up to five previously coded neighboring quantized transform coefficients 718 identified by a template.

A context model can be based on probabilities of a bin's value being '0' or '1'. As values are coded, the probabilities in the context model can be updated based on the actual number of '0' and '1' values encountered. While HEVC used fixed tables to re-initialize context models for each new picture, in NET the probabilities of context models for new inter-predicted pictures can be initialized based on context models developed for previously coded inter-predicted pictures.

The encoder can produce a bitstream that contains entropy encoded bits 722 of residual CUs 710, prediction information such as selected intra prediction modes or motion vectors, indicators of how the CUs 102 were partitioned from a CTU 100 according to the QTBT structure, and/or other information about the encoded video. The bitstream can be decoded by a decoder as discussed below.

In addition to using the quantized transform coefficients 718 to find the final compression bits 722, the encoder can also use the quantized transform coefficients 718 to generate reconstructed CUs 734 by following the same decoding process that a decoder would use to generate reconstructed CUs 734. Thus, once the transformation coefficients have been computed and quantized by the encoder, the quantized transform coefficients 718 may be transmitted to the decoding loop in the encoder. After quantization of a CU's transform coefficients, a decoding loop allows the encoder to generate a reconstructed CU 734 identical to the one the decoder generates in the decoding process. Accordingly, the encoder can use the same reconstructed CUs 734 that a decoder would use for neighboring CUs 102 or reference pictures when performing intra prediction or inter prediction for a new CU 102. Reconstructed CUs 102, reconstructed slices, or full reconstructed frames may serve as references for further prediction stages.

At the encoder's decoding loop (and see below, for the same operations in the decoder) to obtain pixel values for the reconstructed image, a dequantization process may be performed. To dequantize a frame, for example, a quantized value for each pixel of a frame is multiplied by the quantization step, e.g., (Qstep) described above, to obtain reconstructed dequantized transform coefficients 726. For example, in the decoding process shown in FIG. 7A in the encoder, the quantized transform coefficients 718 of a residual CU 710 can be dequantized at 724 to find dequantized transform coefficients 726. If an MDNSST operation was performed during encoding, that operation can be reversed after dequantization.

At 728, the dequantized transform coefficients 726 can be inverse transformed to find a reconstructed residual CU 730, such as by applying a DCT to the values to obtain the reconstructed image. At 732 the reconstructed residual CU 730 can be added to a corresponding prediction CU 702 found with intra prediction at 704 or inter prediction at 706, in order to find a reconstructed CU 734.

At 736, one or more filters can be applied to the reconstructed data during the decoding process (in the encoder or, as described below, in the decoder), at either a picture level or CU level. For example, the encoder can apply a deblocking filter, a sample adaptive offset (SAO) filter, and/or an adaptive loop filter (ALF). The encoder's decoding process may implement filters to estimate and transmit to a decoder the optimal filter parameters that can address potential artifacts in the reconstructed image. Such improvements increase the objective and subjective quality of the reconstructed video. In deblocking filtering, pixels near a sub-CU boundary may be modified, whereas in SAO, pixels in a CTU 100 may be modified using either an edge offset or band offset classification. JVET's ALF can use filters with circularly symmetric shapes for each 2×2 block. An indication of the size and identity of the filter used for each 2×2 block can be signaled. Alternately, in some embodiments in which weighted angular prediction is implemented for the prediction CU, alternate or no filters can be applied to the reconstructed CU.

If reconstructed pictures are reference pictures, they can be stored in a reference buffer 738 for inter prediction of future CUs 102 at 706.

During the above steps, JVET allows content adaptive clipping operations to be used to adjust color values to fit between lower and upper clipping bounds. The clipping bounds can change for each slice, and parameters identifying the bounds can be signaled in the bitstream.

Figure 9:
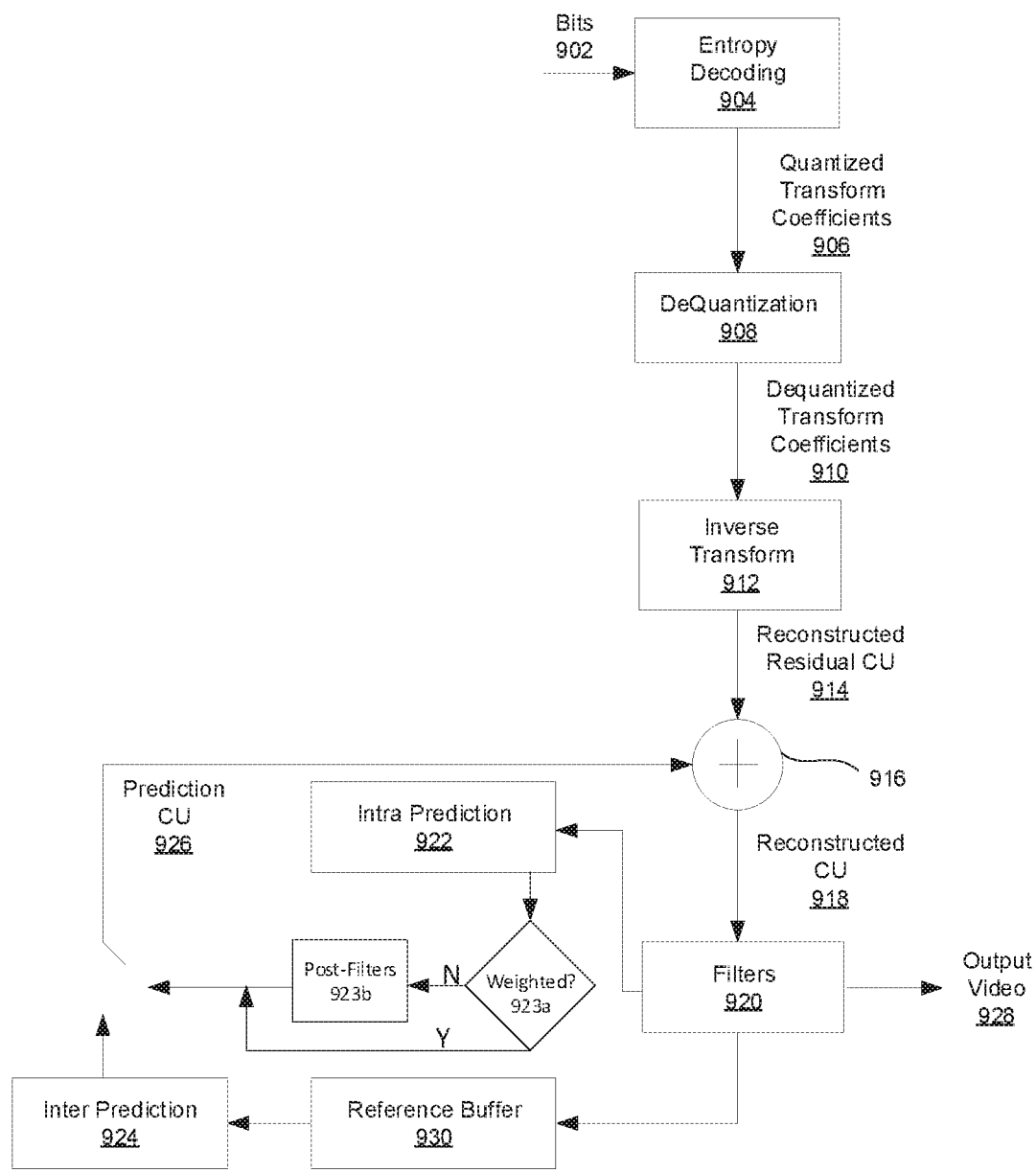
FIG. 9 depicts a simplified block diagram for CU decoding in a JVET encoder.

FIG. 9 depicts a simplified block diagram for CU coding in a JVET decoder. A JVET decoder can receive a bitstream containing information about encoded CUs 102. The bitstream can indicate how CUs 102 of a picture were partitioned from a CTU 100 according to a QTBT structure. By way of a non-limiting example, the bitstream can identify how CUs 102 were partitioned from each CTU 100 in a QTBT using quadtree partitioning, symmetric binary partitioning, and/or asymmetric binary partitioning. The bitstream can also indicate prediction information for the CUs 102 such as intra prediction modes or motion vectors, and bits 902 representing entropy encoded residual CUs.

At 904 the decoder can decode the entropy encoded bits 902 using the CABAC context models signaled in the bitstream by the encoder. The decoder can use parameters signaled by the encoder to update the context models' probabilities in the same way they were updated during encoding.

After reversing the entropy encoding at 904 to find quantized transform coefficients 906, the decoder can dequantize them at 908 to find dequantized transform coefficients 910. If an MDNSST operation was performed during encoding, that operation can be reversed by the decoder after dequantization.

At 912, the dequantized transform coefficients 910 can be inverse transformed to find a reconstructed residual CU 914. At 916, the reconstructed residual CU 914 can be added to a corresponding prediction CU 926 found with intra prediction at 922 or inter prediction at 924, in order to find a reconstructed CU 918.

Thus, in step 923a, it can be determined whether weighted angular prediction has been employed as the intra prediction mode in step 922. If in step 923a, the intra prediction mode is determined as using weighted angular prediction, then the prediction coding unit 926 can be delivered for entropy coding absent filtering. However, if in step 923a, the intra prediction mode is determined to be other than weighted angular prediction, post intra prediction filtering 923b, such as PDPC filtering can be applied to the prediction coding unit prior to delivery for entropy coding.

At 920, one or more filters can be applied to the reconstructed data, at either a picture level or CU level. For example, the decoder can apply a deblocking filter, a sample adaptive offset (SAO) filter, and/or an adaptive loop filter (ALF). As described above, the in-loop filters located in the decoding loop of the encoder may be used to estimate optimal filter parameters to increase the objective and subjective quality of a frame. These parameters are transmitted to the decoder to filter the reconstructed frame at 920 to match the filtered reconstructed frame in the encoder.

After reconstructed pictures have been generated by finding reconstructed CUs 918 and applying signaled filters, the decoder can output the reconstructed pictures as output video 928. If reconstructed pictures are to be used as reference pictures, they can be stored in a reference buffer 930 for inter prediction of future CUs 102 at 924.

Figure 10:
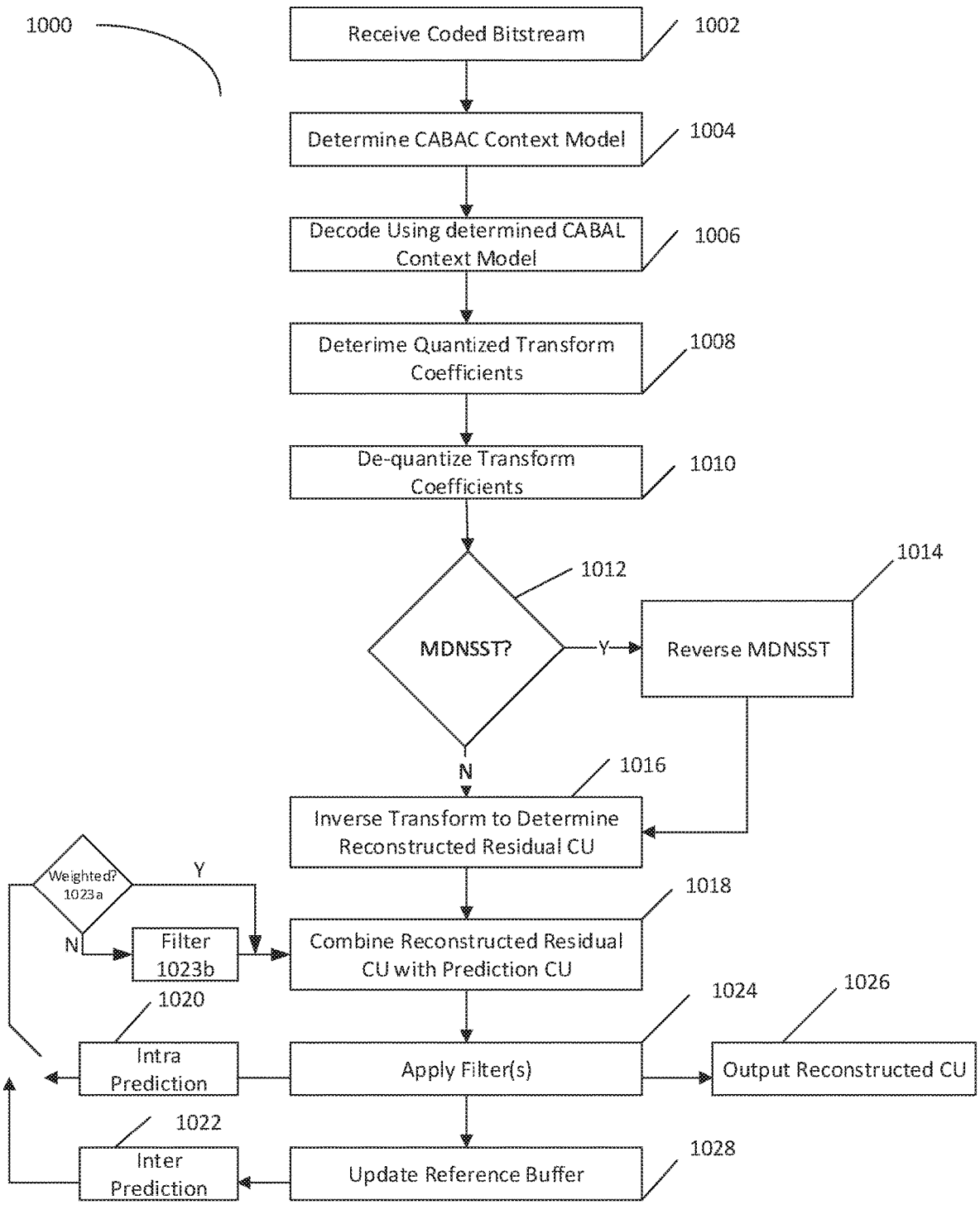
FIG. 10 depicts an embodiment of a method of CU coding in a JVET encoder.

FIG. 10 depicts an embodiment of a method of CU coding 1000 in a JVET decoder. In the embodiment depicted in FIG. 10, in step 1002 an encoded bitstream 902 can be received and then in step 1004 the CABAC context model associated with the encoded bitstream 902 can be determined and the encoded bitstream 902 can then be decoded using the determined CABAC context model in step 1006.

In step 1008, the quantized transform coefficients 906 associated with the encoded bitstream 902 can be determined and de-quantized transform coefficients 910 can then be determined from the quantized transform coefficients 906 in step 1010.

In step 1012, it can be determined whether an MDNSST operation was performed during encoding and/or if the bitstream 902 contains indications that an MDNSST operation was applied to the bitstream 902. If it is determined that an MDNSST operation was performed during the encoding process or the bitstream 902 contains indications that an MDNSST operation was applied to the bitstream 902, then an inverse MDNSST operation 1014 can be implemented before an inverse transform operation 912 is performed on the bitstream 902 in step 1016. Alternately, an inverse transform operation 912 can be performed on the bitstream 902 in step 1016 absent application of an inverse MDNSST operation in step 1014. The inverse transform operation 912 in step 1016 can determine and/or construct a reconstructed residual CU 914.

In step 1018, the reconstructed residual CU 914 from step 1016 can be combined with a prediction CU 918. The prediction CU 918 can be one of an intra-prediction CU 922 determined in step 1020 and an inter-prediction unit 924 determined in step 1022.

Thus, in step 1023a, it can be determined whether weighted angular prediction has been employed as the intra prediction mode in step 1020. If in step 1023a, the intra prediction mode is determined as using weighted angular prediction, then the prediction coding unit 926 can be delivered for entropy coding absent filtering and/or filtering performed in step 1024 can be modified and/or absent. However, if in step 1023a, the intra prediction mode is determined to be other than weighted angular prediction, post intra prediction filtering 1023b and/or at step 1024, such as PDPC filtering can be applied to the prediction coding unit prior to delivery for entropy coding.

As depicted in FIG. 10, in some embodiments step 1023b can be absent and a post intra prediction filter 1024 can be employed after step 1018 for all predictions. In such embodiments depicted in FIG. 10, if the intra prediction mode is based upon other than weighted angular prediction, then the filter applied can applied as it would normally be applied in step 1024. However, if the intra prediction mode is based upon weighted angular prediction filtering in step 1024 can be bypassed and/or in some embodiments, the filter applied can be unbiased toward the main reference, side reference or main and side references prior to output of the reconstructed CU in step 1026. By way on non-limiting example, the values of Cv1 and Ch1 can be equal and/or the values of Cv2 and Ch2 can be equal.

In step 1024, any one or more filters 920 can be applied to the reconstructed CU 914 and output in step 1026. In some embodiments filters 920 may not be applied in step 1024.

In some embodiments, in step 1028, the reconstructed CU 918 can be stored in a reference buffer 930.

Figure 11:
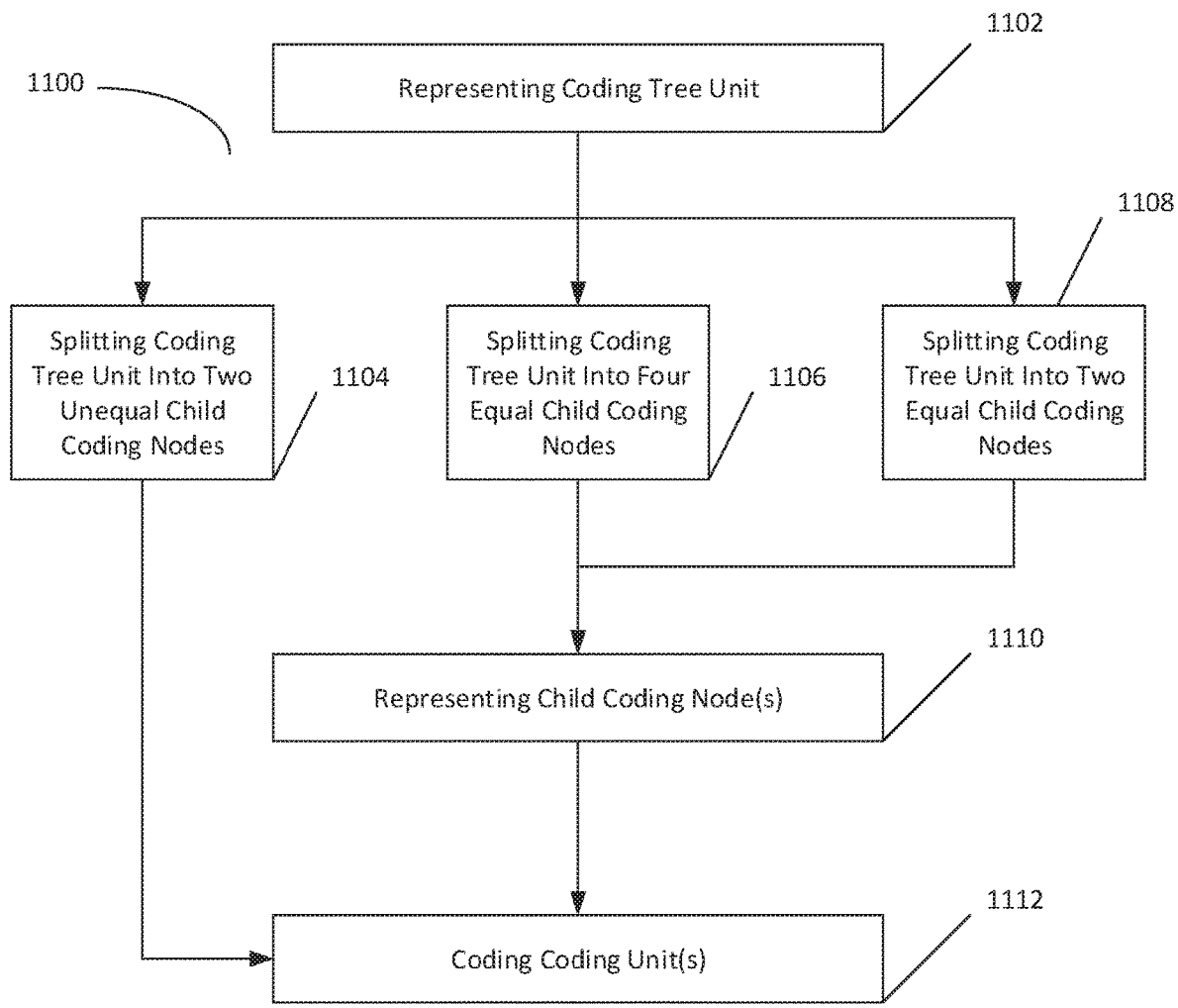
FIG. 11 depicts a simplified block diagram for CU coding in a JVET encoder.

FIG. 11 depicts a simplified block diagram 1100 for CU coding in a JVET encoder. In step 1102 a JVET coding tree unit can be represented as a root node in a quadtree plus binary tree (QTBT) structure. In some embodiments the QTBT can have a quadtree branching from the root node and/or binary trees branching from one or more of the quadtree's leaf nodes. The representation from step 1102 can proceed to step 1104, 1106 or 1108.

In step 1104, asymmetric binary partitioning can be employed to split a represented quadtree node into two blocks of unequal size. In some embodiments, the split blocks can be represented in a binary tree branching from the quadtree node as leaf nodes that can represent final coding units. In some embodiment, the binary tree branching from the quadtree node as leaf nodes represent final coding units in which further splitting is disallowed. In some embodiments the asymmetric partitioning can split a coding unit into blocks of unequal size, a first representing 25% of the quadtree node and a second representing 75% of the quadtree node.

In step 1106, quadtree partitioning can be employed to split a represented quadtree note into four square blocks of equal size. In some embodiments the split blocks can be represented as quadtree notes that represent final coding units or can be represented as child nodes that can be split again with quadtree partitioning, symmetric binary partitioning, or asymmetric binary partitioning.

In step 1108 quadtree partitioning can be employed to split a represented quadtree note into two blocks of equal size. In some embodiments the split blocks can be represented as quadtree notes that represent final coding units or can be represented as child nodes that can be split again with quadtree partitioning, symmetric binary partitioning, or asymmetric binary partitioning.

In step 1110, child nodes from step 1106 or step 1108 can be represented as child nodes configured to be encoded. In some embodiments the child nodes can be represented by leaf notes of the binary tree with JVET.

In step 1112, coding units from step 1104 or 1110 can be encoded using JVET.

Figure 12:
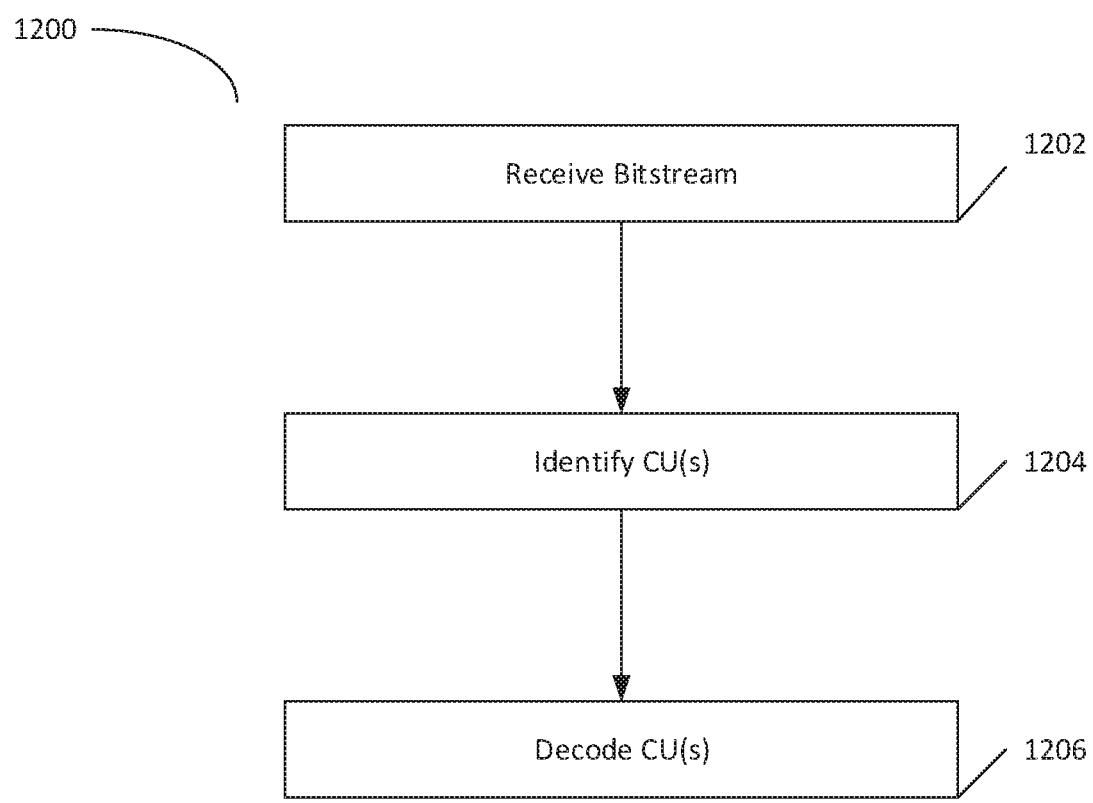
FIG. 12 depicts a simplified block diagram for CU decoding in a JVET decoder.

FIG. 12 depicts a simplified block diagram 1200 for CU decoding in a JVET decoder. In the embodiment depicted in FIG. 12, in step 1202 a bitstream indicating how a coding tree unit was partitioned into coding units according to a QTBT structure can be received. The bitstream can indicate how quadtree nodes are split with at least one of quadtree partitioning, symmetric binary partitioning or asymmetric binary partitioning.

In step 1204, coding units, represented by leaf nodes of the QTBT structure can be identified. In some embodiments, the coding units can indicate whether a node was split from a quadtree leaf node using asymmetric binary partitioning. In some embodiments, the coding unit can indicate that the node represents a final coding unit to be decoded.

In step 1206, the identified coding unit(s) can be decoded using JVET.

Figure 13:
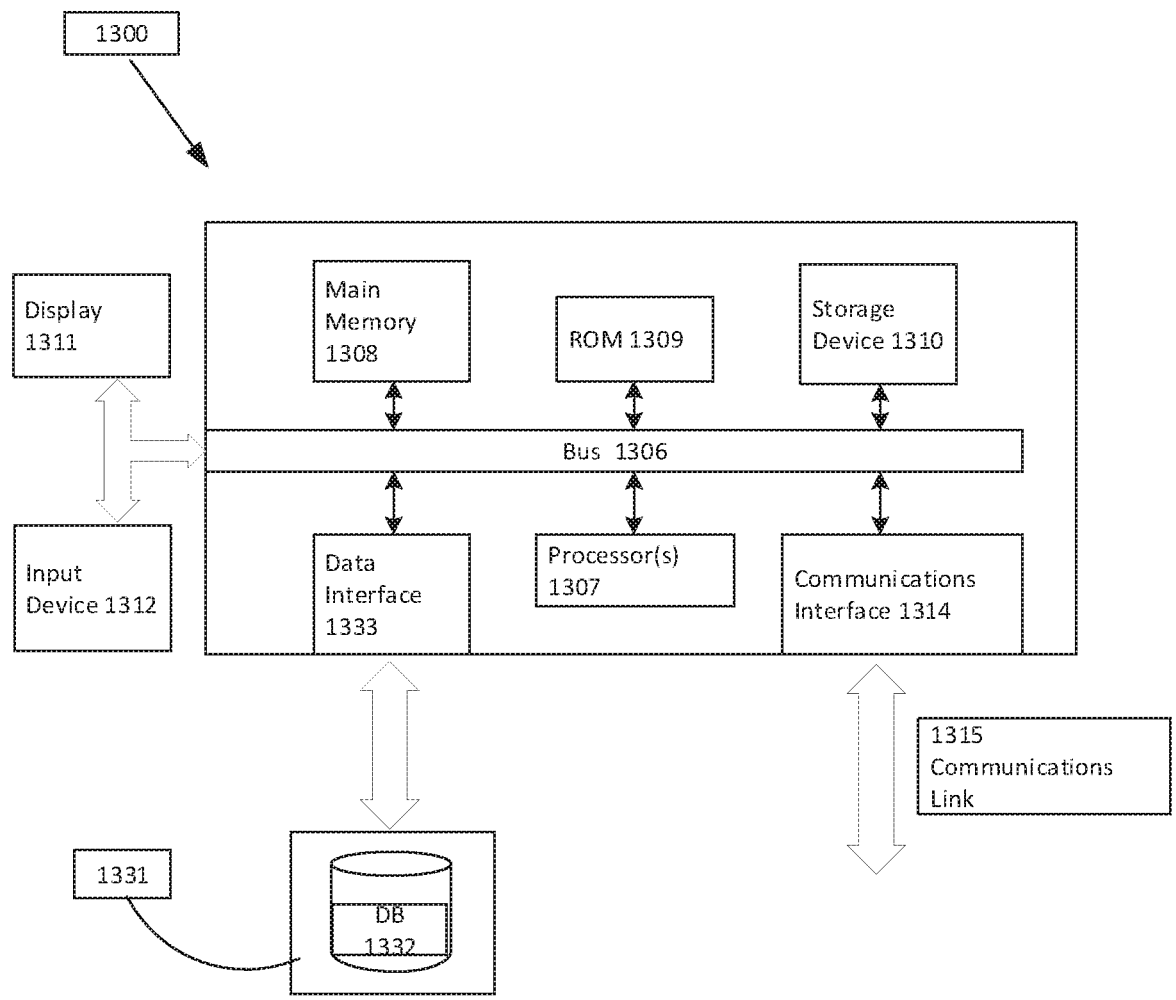
FIG. 13 depicts an embodiment of a computer system adapted and/or configured to process a method of CU coding.

The execution of the sequences of instructions required to practice the embodiments can be performed by a computer system 1300 as shown in FIG. 13. In an embodiment, execution of the sequences of instructions is performed by a single computer system 1300. According to other embodiments, two or more computer systems 1300 coupled by a communication link 1315 can perform the sequence of instructions in coordination with one another. Although a description of only one computer system 1300 will be presented below, however, it should be understood that any number of computer systems 1300 can be employed to practice the embodiments.

A computer system 1300 according to an embodiment will now be described with reference to FIG. 13, which is a block diagram of the functional components of a computer system 1300. As used herein, the term computer system 1300 is broadly used to describe any computing device that can store and independently run one or more programs.

Each computer system 1300 can include a communication interface 1314 coupled to the bus 1306. The communication interface 1314 provides two-way communication between computer systems 1300. The communication interface 1314 of a respective computer system 1300 transmits and receives electrical, electromagnetic or optical signals that include data streams representing various types of signal information, e.g., instructions, messages and data. A communication link 1315 links one computer system 1300 with another computer system 1300. For example, the communication link 1315 can be a LAN, in which case the communication interface 1314 can be a LAN card, or the communication link 1315 can be a PSTN, in which case the communication interface 1314 can be an integrated services digital network (ISDN) card or a modem, or the communication link 1315 can be the Internet, in which case the communication interface 1314 can be a dial-up, cable or wireless modem.

A computer system 1300 can transmit and receive messages, data, and instructions, including program, i.e., application, code, through its respective communication link 1315 and communication interface 1314. Received program code can be executed by the respective processor(s) 1307 as it is received, and/or stored in the storage device 1310, or other associated non-volatile media, for later execution.

In an embodiment, the computer system 1300 operates in conjunction with a data storage system 1331, e.g., a data storage system 1331 that contains a database 1332 that is readily accessible by the computer system 1300. The computer system 1300 communicates with the data storage system 1331 through a data interface 1333. A data interface 1333, which is coupled to the bus 1306, transmits and receives electrical, electromagnetic or optical signals, that include data streams representing various types of signal information, e.g., instructions, messages and data. In embodiments, the functions of the data interface 1333 can be performed by the communication interface 1314.

Computer system 1300 includes a bus 1306 or other communication mechanism for communicating instructions, messages and data, collectively, information, and one or more processors 1307 coupled with the bus 1306 for processing information. Computer system 1300 also includes a main memory 1308, such as a random access memory (RAM) or other dynamic storage device, coupled to the bus 1306 for storing dynamic data and instructions to be executed by the processor(s) 1307. The main memory 1308 also can be used for storing temporary data, i.e., variables, or other intermediate information during execution of instructions by the processor(s) 1307.

The computer system 1300 can further include a read only memory (ROM) 1309 or other static storage device coupled to the bus 1306 for storing static data and instructions for the processor(s) 1307. A storage device 1310, such as a magnetic disk or optical disk, can also be provided and coupled to the bus 1306 for storing data and instructions for the processor(s) 1307.

A computer system 1300 can be coupled via the bus 1306 to a display device 1311, such as, but not limited to, a cathode ray tube (CRT) or a liquid-crystal display (LCD) monitor, for displaying information to a user. An input device 1312, e.g., alphanumeric and other keys, is coupled to the bus 1306 for communicating information and command selections to the processor(s) 1307.

According to one embodiment, an individual computer system 1300 performs specific operations by their respective processor(s) 1307 executing one or more sequences of one or more instructions contained in the main memory 1308. Such instructions can be read into the main memory 1308 from another computer-usable medium, such as the ROM 1309 or the storage device 1310. Execution of the sequences of instructions contained in the main memory 1308 causes the processor(s) 1307 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1307. Such a medium can take many forms, including, but not limited to, non-volatile, volatile and transmission media. Non-volatile media, i.e., media that can retain information in the absence of power, includes the ROM 1309, CD ROM, magnetic tape, and magnetic discs. Volatile media, i.e., media that can not retain information in the absence of power, includes the main memory 1308. Transmission media includes coaxial cables, copper wire and fiber optics, including the wires that comprise the bus 1306. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk)

that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Figure 14:
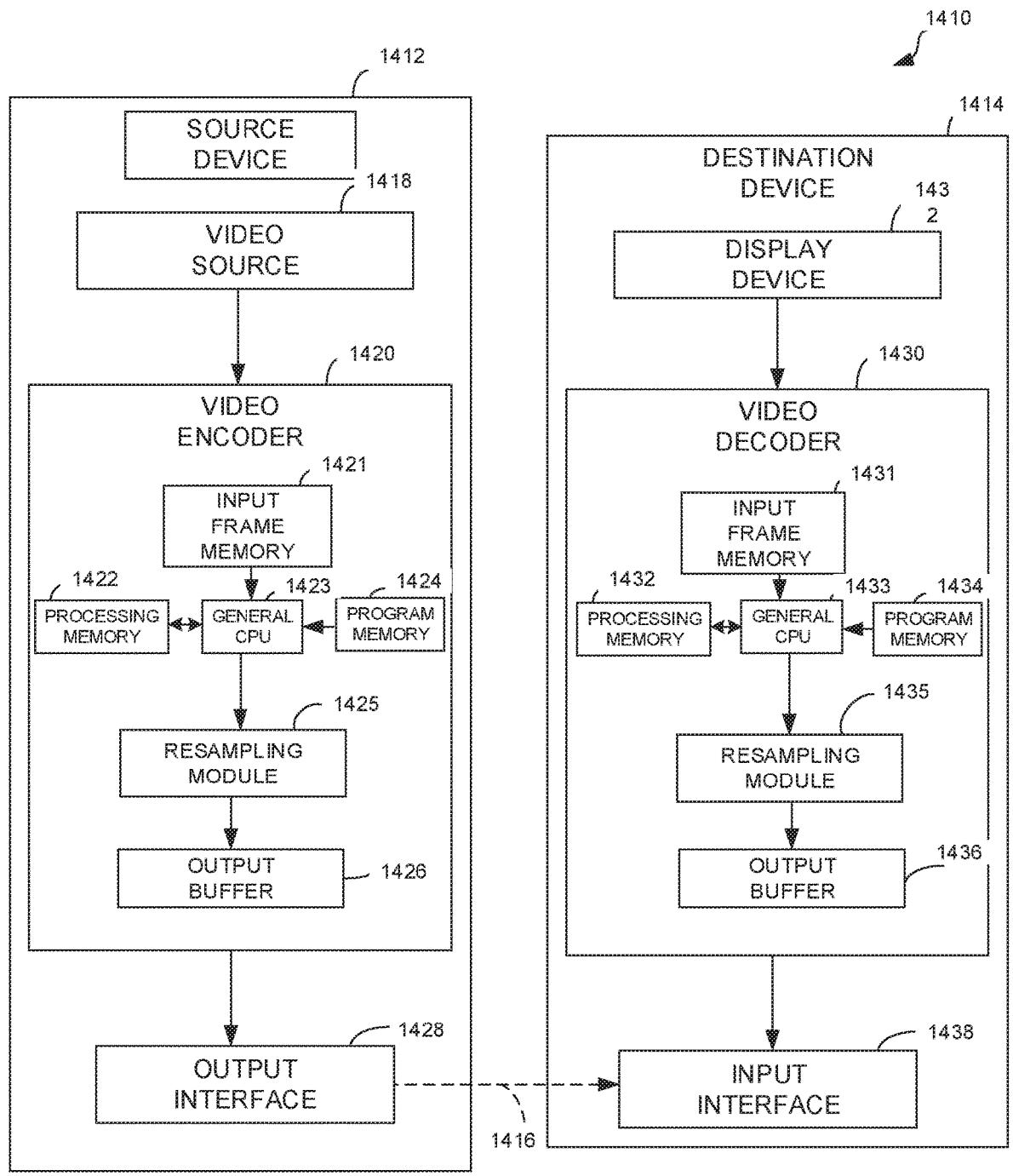
FIG. 14 depicts an embodiment of a coder/decoder system for CU coding/decoding in a JVET encoder/decoder.

FIG. 14 is a high level view of a source device 1412 and destination device 1410 that may incorporate features of the systems and devices described herein. As shown in FIG. 14, example video coding system 1410 includes a source device 1412 and a destination device 1414 where, in this example, the source device 1412 generates encoded video data. Accordingly, source device 1412 may be referred to as a video encoding device. Destination device 1414 may decode the encoded video data generated by source device 1412. Accordingly, destination device 1414 may be referred to as a video decoding device. Source device 1412 and destination device 1414 may be examples of video coding devices.

Destination device 1414 may receive encoded video data from source device 1412 via a channel 1416. Channel 1416 may comprise a type of medium or device capable of moving the encoded video data from source device 1412 to destination device 1414. In one example, channel 1416 may comprise a communication medium that enables source device 1412 to transmit encoded video data directly to destination device 1414 in real-time.

In this example, source device 1412 may modulate the encoded video data according to a communication standard, such as a wireless communication protocol, and may transmit the modulated video data to destination device 1414. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 1412 to destination device 1414. In another example, channel 1416 may correspond to a storage medium that stores the encoded video data generated by source device 1412.

In the example of FIG. 14, source device 1412 includes a video source 1418, video encoder 1420, and an output interface 1422. In some cases, output interface 1428 may include a modulator/demodulator (modem) and/or a transmitter. In source device 1412, video source 1418 may include a source such as a video capture device, e.g., a video camera, a video archive containing previously captured video data, a video feed interface to receive video data from a video content provider, and/or a computer graphics system for generating video data, or a combination of such sources.

Video encoder 1420 may encode the captured, pre-captured, or computer-generated video data. An input image may be received by the video encoder 1420 and stored in the input frame memory 1421. The general purpose processor 1423 may load information from here and perform encoding. The program for driving the general purpose processor may be loaded from a storage device, such as the example memory modules depicted in FIG. 14. The general purpose processor may use processing memory 1422 to perform the encoding, and the output of the encoding information by the general processor may be stored in a buffer, such as output buffer 1426.

The video encoder 1420 may include a resampling module 1425 which may be configured to code (e.g., encode) video data in a scalable video coding scheme that defines at least one base layer and at least one enhancement layer. Resampling module 1425 may resample at least some video data as part of an encoding process, wherein resampling may be performed in an adaptive manner using resampling filters.

The encoded video data, e.g., a coded bit stream, may be transmitted directly to destination device 1414 via output interface 1428 of source device 1412. In the example of FIG. 14, destination device 1414 includes an input interface 1438, a video decoder 1430, and a display device 1432. In some cases, input interface 1428 may include a receiver and/or a modem. Input interface 1438 of destination device 1414 receives encoded video data over channel 1416. The encoded video data may include a variety of syntax elements generated by video encoder 1420 that represent the video data. Such syntax elements may be included with the encoded video data transmitted on a communication medium, stored on a storage medium, or stored a file server.

The encoded video data may also be stored onto a storage medium or a file server for later access by destination device 1414 for decoding and/or playback. For example, the coded bitstream may be temporarily stored in the input buffer 1431, then loaded in to the general purpose processor 1433. The program for driving the general purpose processor may be loaded from a storage device or memory. The general purpose processor may use a process memory 1432 to perform the decoding. The video decoder 1430 may also include a resampling module 1435 similar to the resampling module 1425 employed in the video encoder 1420.

FIG. 14 depicts the resampling module 1435 separately from the general purpose processor 1433, but it would be appreciated by one of skill in the art that the resampling function may be performed by a program executed by the general purpose processor, and the processing in the video encoder may be accomplished using one or more processors. The decoded image(s) may be stored in the output frame buffer 1436 and then sent out to the input interface 1438.

Display device 1438 may be integrated with or may be external to destination device 1414. In some examples, destination device 1414 may include an integrated display device and may also be configured to interface with an external display device. In other examples, destination device 1414 may be a display device. In general, display device 1438 displays the decoded video data to a user.

Video encoder 1420 and video decoder 1430 may operate according to a video compression standard. ITU-T VCEG (Q6/16) and ISO/IEC MPEG (JTC 1/SC 29/WG 11) are studying the potential need for standardization of future video coding technology with a compression capability that significantly exceeds that of the current High Efficiency Video Coding HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area. A recent capture of JVET development is described in the "Algorithm Description of Joint Exploration Test Model 5 (JEM 5)", JVET-E1001-V2, authored by J. Chen, E. Alshina, G. Sullivan, J. Ohm, J. Boyce.

Additionally or alternatively, video encoder 1420 and video decoder 1430 may operate according to other proprietary or industry standards that function with the disclosed JVET features. Thus, other standards such as the ITU-T H.264 standard, alternatively referred to as MPEG-4, Part 10, Advanced Video Coding (AVC), or extensions of such standards. Thus, while newly developed for JVET, techniques of this disclosure are not limited to any particular coding standard or technique. Other examples of video compression standards and techniques include MPEG-2, ITU-T H.263 and proprietary or open source compression formats and related formats.

Video encoder 1420 and video decoder 1430 may be implemented in hardware, software, firmware or any combination thereof. For example, the video encoder 1420 and decoder 1430 may employ one or more processors, digital signal processors (DSPs), application specific integrated circuits (ASICs), field programmable gate arrays (FPGAs), discrete logic, or any combinations thereof. When the video encoder 1420 and decoder 1430 are implemented partially in software, a device may store instructions for the software in a suitable, non-transitory computer-readable storage medium and may execute the instructions in hardware using one or more processors to perform the techniques of this disclosure. Each of video encoder 1420 and video decoder 1430 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer, such as the general purpose processors 1423 and 1433 described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor, such as processor 1423 and 1433.

A storage device may also store instructions, instructions, such as source code or binary code, for performing the techniques described above. A storage device may additionally store data used and manipulated by the computer processor. For example, a storage device in a video encoder 1420 or a video decoder 1430 may be a database that is accessed by computer system 1423 or 1433. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

The invention claimed is:
1. A method of coding video comprising:
defining a coding unit (CU) within a coding area of a video frame having CU x and CU y coordinates;
determining whether said coding unit is encoded using a weighted angular prediction or a different prediction;
if said coding unit is said determined to be encoded using said weighted angular prediction for intra prediction, then,
(a) defining a main reference pixel within said coding area having main x and main y coordinates associated with said main reference;
(b) defining a side reference pixel within said coding area having side x and side y coordinates associated with said side reference;
(c) determining a main weight value associated with said main reference pixel;
(d) determining a side weight value associated with said side reference pixel; and
(e) generating a prediction CU for said coding unit based at least in part on a combination of said main reference pixel weighted by said main weight value and said side reference pixel weighted by said side weight value,
(f) wherein said prediction CU is subsequently delivered for entropy coding absent post-generation filtering after said generating said prediction CU for said coding unit based at least in part on said combination;

if said coding unit is not said determined to be encoded using said weighted angular prediction for said intra prediction, then,
(a) generating a prediction CU for for said coding unit based at least in part on said another prediction,
(b) where said generation based at least in part on said another prediction is not based on said combination of said main reference pixel weighted by said main weight value and said side reference pixel weighted by said side weight value,
(c) wherein said prediction CU is filtered based upon said post generation filtering that is biased to neither the main reference pixel nor the side reference pixel resulting in a filtered prediction CU,
(d) wherein said filtered prediction CU is subsequently delivered for entropy coding.

2. The method of coding video of claim 1 wherein said main weight value is based at least in part on a distance between said coding unit and said main reference pixel and said side weight value is based at least in part on a distance between said coding unit and said side reference pixel.

3. The method of coding video of claim 2 wherein said main reference pixel is located above said coding unit.

4. The method of coding video of claim 3 wherein said side reference pixel is located to the left of said coding unit.

5. The method of coding video of claim 1 wherein said coding unit is located below said main reference and to the right of said side reference.

6. The method of coding video of claim 5 wherein said main weight value is based at least in part on a distance between said coding unit and said main reference pixel and said side weight value is based at least in part on a distance between said coding unit and said side reference pixel.

* * * * *